(12) United States Patent
Kerrebrock et al.

(10) Patent No.: US 8,205,827 B2
(45) Date of Patent: Jun. 26, 2012

(54) HYDRAZINE MONOPROPELLANT DECOMPOSITION AIR TURBOPROP ENGINE

(75) Inventors: Jack Kerrebrock, Lincoln, MA (US); Jean-Charles Lede, Manassas, VA (US); Jeremy Scott Hollman, Quincy, MA (US)

(73) Assignee: Aurora Flight Sciences Corporation, Manassas, VA (US)

( * ) Notice: Subject to any disclaimer, the term of this patent is extended or adjusted under 35 U.S.C. 154(b) by 714 days.

(21) Appl. No.: 12/323,820

(22) Filed: Nov. 26, 2008

(65) Prior Publication Data

US 2009/0184195 A1    Jul. 23, 2009

Related U.S. Application Data

(60) Provisional application No. 61/023,081, filed on Jan. 23, 2008.

(51) Int. Cl.
*B64D 27/00* (2006.01)
(52) U.S. Cl. ........................ 244/59; 60/39.462
(58) Field of Classification Search .................... 244/59, 244/53 R, 62; 60/39.462, 39.17, 264, 791
See application file for complete search history.

(56) References Cited

U.S. PATENT DOCUMENTS

| | | | | |
|---|---|---|---|---|
| 2,930,184 A | * | 3/1960 | Plescia et al. | 252/374 |
| 3,581,504 A | * | 6/1971 | Andrus | 60/259 |
| 3,898,794 A | * | 8/1975 | Ariga | 60/39.181 |
| 4,092,824 A | * | 6/1978 | Friedrich | 60/778 |
| 4,490,972 A | * | 1/1985 | Ellion et al. | 60/39.462 |
| 4,819,423 A | * | 4/1989 | Vershure et al. | 60/778 |
| 5,477,672 A | * | 12/1995 | Tsujikado et al. | 60/39.462 |

* cited by examiner

*Primary Examiner* — Tien Dinh
*Assistant Examiner* — Keith L Dixon
(74) *Attorney, Agent, or Firm* — Katten Muchin Rosenman LLP

(57) ABSTRACT

An engine for use in operating an aircraft is disclosed, the engine comprising a decomposition chamber configured to decompose into at least one combustible constituent element a first chemically unstable substance in the presence of a catalyst, wherein the decomposition of the first chemically unstable substance releases a first amount of heat; a first turbine configured to accept the constituent elements and the first amount of heat from the decomposition chamber and thereby rotate; a compressor rotationally connected to the first turbine, and configured to compress air when the first turbine rotates; and a combustion chamber configured to accept the compressed air and constituent elements and combust the combination, substantially regardless of an altitude above sea level and ambient air pressure, and output the combustion products into a power turbine, causing it to rotate, whereby the rotation of the first turbine and/or the power turbine rotate a propeller rotationally coupled to the first and power turbines. Alternately, a nozzle can be used in place of the power turbine, thereby creating a jet engine.

28 Claims, 5 Drawing Sheets

HYDRAZINE MONOPROPELLANT DECOMPOSITION AIR TURBOPROP ENGINE

PRIORITY

The present application claims priority under 35 U.S.C. §119(e) to U.S. Provisional Patent Application Ser. No. 61/023,081 filed Jan. 23, 2008, the entire contents of which are herein expressly incorporated by reference.

The present invention was made with United States Government support under W31P4Q-07-C-0301, awarded by U.S. Army Aviation and Missile Command. The U.S. Government has certain rights in the invention.

BACKGROUND OF THE INVENTION

1. Field of the Invention

The invention relates to internal combustion engines for aircraft. More particularly, the invention relates to an internal combustion engine that uses hydrazine as a monopropellant in a turboprop engine for a high altitude aircraft.

2. Background Art

For aircraft that operate at very high altitudes, the choice of a propulsion system generally does not include internal combustion engines, including turbine engines. As used within this specification, very high altitudes means altitudes up to and including about 110,000 feet. At these altitudes, air pressure is so low (about 0.6 inHg, an average, compared to about 29.92 inHg. at about sea-level, on average) that conventional gas turbines, fueled by hydrocarbons, are impractical for at least two reasons. First, low air pressure slows the combustion reactions in the engines combustion chamber to the extent that combustion cannot be stabilized in a practical configuration. Secondly, the low air pressure lowers the Reynolds number of the air flow in the engine's compressor and turbine, exacerbating the effects of viscous flows and lowering the efficiency of the compressor and turbine. In gas turbines, the useful power is the difference of the turbine and compressor powers, and henceforth depends critically on the efficiency of these two components. The effects of low air pressure and low Reynolds numbers are such as to limit conventional gas turbines to flight altitudes of approximately 65,000 feet or less.

However, as those of ordinary skill in the art can appreciate, expanding the regime in which gas turbine engines can operate can be extremely beneficial. Gas turbine engines have a good power-to-weight ratios, and exhibit high efficiency at lower subsonic airspeeds (300 knots plus).

Thus, a need exists to develop a gas turbine engine that can operate at very high attitudes.

SUMMARY OF THE INVENTION

It is therefore a general aspect of the invention to provide a hydrazine monopropellant decomposition air turboprop engine that will obviate or minimize problems of the type previously described. According to a first aspect of the present invention, therefore, an engine for use in operating an aircraft is provided comprising: a decomposition chamber configured to decompose into at least one combustible constituent element a first chemically unstable substance in the presence of a catalyst, wherein the decomposition of the first chemically unstable substance releases a first amount of heat and the first combustible constituent element expands as a result of the first amount of heat; a first turbine fluidly connected to the decomposition chamber, wherein the first turbine is configured to receive the expanded at least one constituent combustible element and the first amount of heat from the decomposition chamber, wherein the first turbine is further configured to rotate after receiving the expanded at least one constituent combustible element; a compressor rotationally connected to the first turbine, and configured to rotate as a result of the rotation of the first turbine, and wherein the compressor is further configured to receive air, and is further configured to compress the air as a result of the rotation of the compressor; and a combustion chamber fluidly connected to the first turbine and the compressor, and wherein the combustion chamber is configured to receive and combine the compressed air and the at least one combustible constituent element, and wherein the combustion chamber is further configured to combust the combination, thereby generating a combustion product.

According to the first aspect, the first chemically unstable substance comprises hydrazine, and the combustible constituent element comprises hydrogen.

According to the first aspect, the engine further comprises a propeller; a power turbine fluidly connected to the combustion chamber, wherein the power turbine is configured to receive the combustion product from the combustion chamber, and wherein the power turbine is configured to rotate as a result of the received combustion product; and a shaft rotationally connected to the propeller, power turbine, and the first turbine, and wherein the shaft and propeller are configured to rotate when the power turbine and the first turbine rotates.

Still further according to the first aspect, the power turbine is rotationally coupled to the first turbine and the compressor, and the power turbine is configured to rotate as a result of the rotation of the first turbine, and the power turbine is further configured to produce aircraft propulsion power after receiving the combustion product, and further wherein the power turbine is further configured to increase and decrease production of aircraft power is proportional to a first amount of the first combustible constituent element.

According to the first aspect, the engine further comprises a gearbox, wherein the gearbox is interposed between the propeller shaft and the propeller, and wherein, the gearbox is configured to vary the rotational speed of the propeller in relation to the rotational speed of the propeller shaft.

According to the first aspect, the engine still further comprises a nozzle fluidly connected to the combustion chamber, wherein the nozzle is configured to receive the combustion product and convert the combustion product into a substantially high pressure exhaust stream.

According to the first aspect, the aircraft is operated at an altitude of at least 85,000 feet above sea level, and a first mass flow in the first turbine is different from a second mass flow in the compressor. Further still according to the first aspect, the first mass flow in the first turbine is less than a second mass flow in the compressor.

According to the first aspect, a mixture ratio of hydrogen to air in the combustion chamber is between about 1:3 and about 1:8. According to the first aspect, the mixture ratio of hydrogen to air in the combustion chamber is about 1:5.

According to the first aspect, the engine still further comprises a diffuser fluidly connected to the compressor, wherein the diffuser is configured to receive ambient air and diffuse the ambient air, and wherein the diffuser is further configured to output the diffused air to the compressor.

According to a second aspect of the present invention, an engine for use in operating an aircraft is provided comprising: a decomposition chamber configured to decompose a first chemically unstable substance in the presence of a catalyst, into a fuel, wherein the decomposition of the first chemically unstable substance releases a first amount of heat; a first turbine fluidly connected to the decomposition chamber, wherein the decomposition chamber is configured to receive the first amount of heat from the decomposition chamber and to rotate as a result of the first amount of heat; a compressor rotationally connected to the first turbine, and wherein the compressor is configured to compress air; and a combustion chamber fluidly connected to the compressor to receive the compressed air, and fluidly connected to the decomposition chamber to receive the fuel, and wherein the combustion chamber is configured to mix the received compressed are and fuel, and is further configured to combust the fuel and compressed air mixture to produce power.

According to a third aspect of the present invention, an engine for use in operating an aircraft is provided comprising: a decomposition chamber configured to decompose into at least one combustible constituent element a first chemically unstable substance in the presence of a catalyst, wherein the decomposition of the first chemically unstable substance releases a first amount of heat; and a combustion chamber fluidly connected to the decomposition chamber and wherein the combustion chamber is configured to burn the at least one combustible constituent element and to produce power, and wherein an amount of the produced power is substantially directly related to the first amount of heat released.

According to a fourth aspect of the present invention, an engine for use in operating an aircraft is provided comprising: a decomposition chamber configured to decompose into at least one combustible constituent element a first chemically unstable substance in the presence of a catalyst, wherein the decomposition of the first chemically unstable substance releases a first amount of heat; a compressor fluidly connected to the decomposition chamber to receive the at least one combustible constituent element, and wherein the compressor is configured to compress ambient air; and a combustion chamber fluidly connected to the compressor and the decomposition chamber, and wherein the combustion chamber is configured to receive and mix the compressed ambient air and the at least one combustible constituent element, and wherein the combustion chamber is configured to burn the mixture of the at least one combustible constituent element and the compressed air when the ambient air pressure is less than about 0.3 psi to produce power.

According to a fifth aspect of the present invention, an engine for use in operating an aircraft is provided comprising: a decomposition chamber configured to decompose into at least one combustible constituent element a first element of a first chemically unstable substance in the presence of a catalyst, wherein the decomposition of the first chemically unstable substance releases a first amount of heat; a first turbine fluidly connected to the decomposition chamber, and wherein the first turbine is configured to receive the at least one constituent element and the first amount of heat from the decomposition chamber, and wherein upon receipt of the first amount of heat the first turbine is configured to rotate; a compressor rotationally connected to the first turbine, wherein the compressor is configured to receive ambient air, and the compressor is further configured to compress the ambient air; a combustion chamber fluidly connected to the compressor and the decomposition chamber, and wherein the combustion chamber is configured to receive the compressed air and the at least one constituent element from the decomposition chamber and to combust the combination; and a second power turbine fluidly connected to the combustion chamber, and wherein the second power turbine is configured to rotate and produce power as a result of the combustion of the air and the at least one constituent element, and further wherein the second power turbine is configured to increase or decrease production of power in proportion to a first amount of the first chemically unstable substance.

According to a sixth aspect of the present invention, an aircraft operating at or above 85,000 feet above sea level is provided comprising: a fuselage; one or more lift generating surfaces attached or part of the fuselage; one or more control surfaces, wherein the control surfaces are configured to control the aircraft in roll, spin and yaw directions; and an engine, wherein the engine includes a decomposition chamber configured to decompose into at least one combustible constituent element a first chemically unstable substance in the presence of a catalyst, wherein the decomposition of the first chemically unstable substance releases a first amount of heat and the first combustible constituent element expands as a result of the first amount of heat; a first turbine fluidly connected to the decomposition chamber, wherein the first turbine is configured to receive the expanded at least one constituent combustible element from the decomposition chamber, wherein the first turbine is further configured to rotate after receiving the expanded at least one constituent combustible element; a compressor rotationally connected to the first turbine, and configured to rotate as a result of the rotation of the first turbine, and wherein the compressor is further configured to receive air, and is further configured to compress the air as a result of the rotation of the compressor; and a combustion chamber fluidly connected to the first turbine and the compressor, and wherein the combustion chamber is configured to receive and combine the compressed air and the at least one combustible constituent element, and wherein the combustion chamber is further configured to combust the combination, thereby generating a combustion product.

According to the sixth aspect, the first chemically unstable substance comprises hydrazine, and the combustible constituent element comprises hydrogen.

According to the sixth aspect, the aircraft further comprises a propeller; a power turbine fluidly connected to the combustion chamber, wherein the power turbine is configured to receive the combustion product from the combustion chamber, and wherein the power turbine is configured to rotate as a result of the received combustion product; a shaft rotationally connected to the propeller, power turbine, and the first turbine, and wherein the shaft and propeller are configured to rotate when the power turbine and the first turbine rotates; a gearbox, wherein the gearbox is interposed between the propeller shaft and the propeller, and wherein, the gearbox is configured to vary the rotational speed of the propeller in relation to the rotational speed of the propeller shaft; and a diffuser fluidly connected to the compressor, wherein the diffuser is configured to receive ambient air and diffuse the ambient air, and wherein the diffuser is further configured to output the diffused air to the compressor.

According to the sixth aspect, the engine further comprises a nozzle fluidly connected to the combustion chamber, wherein the nozzle is configured to receive the combustion product and convert the combustion product into a substantially high pressure exhaust stream.

According to the sixth aspect, the aircraft is operated at an altitude of at least 85,000 feet above sea level further still according to the sixth aspect, a first mass flow in the first turbine is different from a second mass flow in the compressor, and wherein the first mass flow in the first turbine is less than the second mass flow in the compressor.

According to the sixth aspect, a mixture ratio of hydrogen to air in the combustion chamber is between about 1:3 and about 1:8.

According to the sixth aspect, the mixture ratio of hydrogen to air in the combustion chamber is about 1:5.

BRIEF DESCRIPTION OF THE DRAWINGS

The novel features and advantages of the present invention will best be understood by reference to the detailed description of the preferred embodiments that follows, when read in conjunction with the accompanying drawings, in which.

DETAILED DESCRIPTION OF THE PREFERRED EMBODIMENTS

Figure 1:
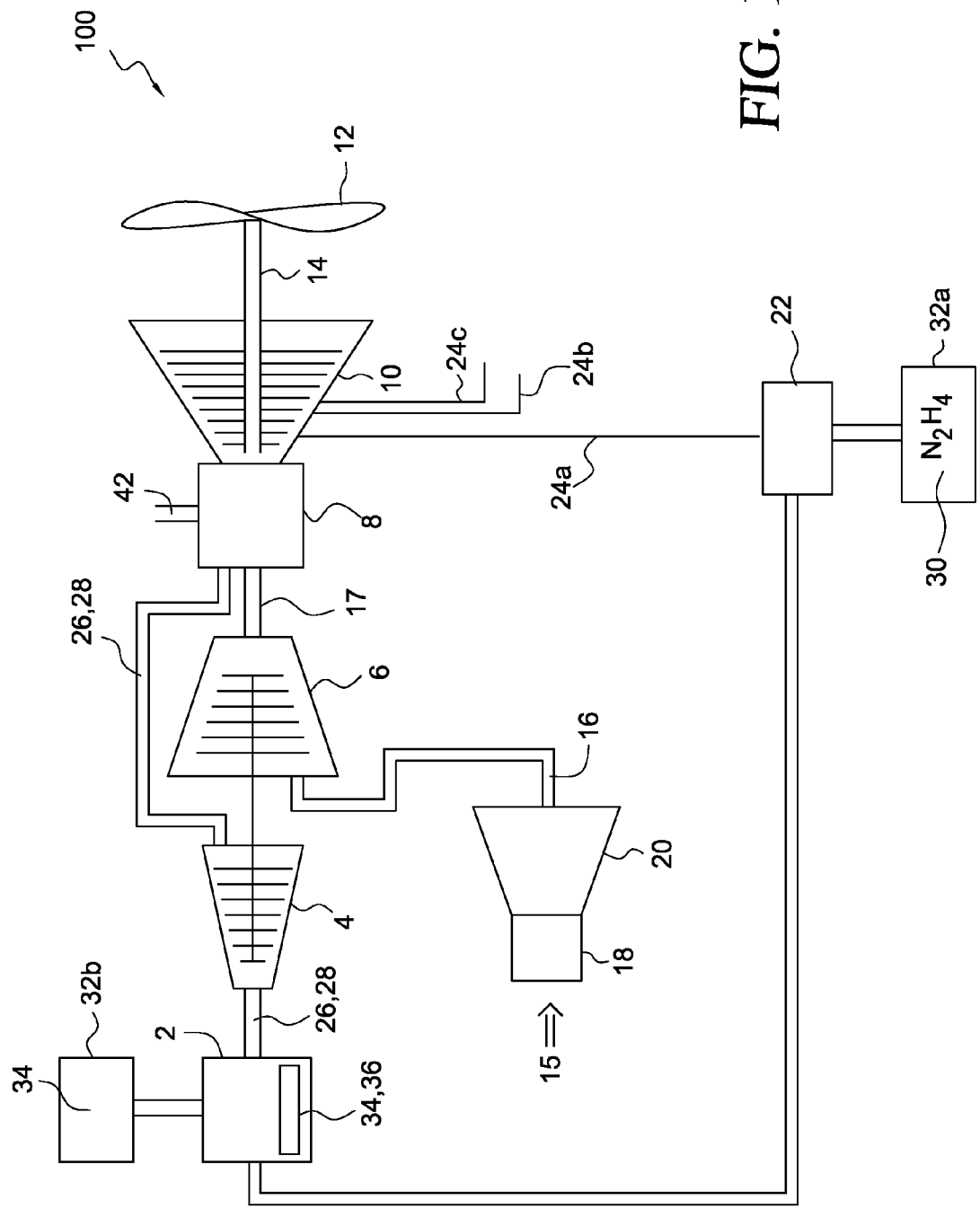
FIG. 1 illustrates a block diagram of a very high altitude hydrazine monopropellant decomposition air turboprop engine according to an embodiment of the present invention.

The various features of the preferred embodiments will now be described with reference to the drawing figures, in which like parts are identified with the same reference characters. The following description of the presently contemplated best mode of practicing the invention is not to be taken in a limiting sense, but is provided merely for the purpose of describing the general principles of the invention.

I. Monopropellant Air Turboprop

FIG. 1 illustrates a block diagram of a very high altitude hydrazine monopropellant decomposition air turboprop engine 100 according to an exemplary embodiment. According to an exemplary embodiment, a hydrazine decomposition air turboprop (HDAT) engine 100 is provided that overcomes the problems and limitations of the prior art, allowing aircraft that operate at very high altitudes to use an internal combustion gas turbine engine. According to a preferred embodiment, very high altitude can be defined to comprise altitudes from about 85,000 feet to about 150,000 feet. Furthermore, as those of ordinary skill in the art can appreciate, the value of the ambient air density at about 110,000 feet above sea level about 0.8% of that at sea level, and the pressure at about 110,000 feet about sea level is about 0.7% of that at sea level. An HDAT engine 100 according to a preferred embodiment employs hydrazine ($N_2H_4$) 30 as a fuel instead of a hydrocarbon, and relaxes the compressor-turbine power matching requirement. In known or conventional engines, the same air is used in the turbine that runs the compressor. However, according to a preferred embodiment, the mass flow in turbine 4 is different than the mass flow in compressor 6 because the amount of air in turbine 4 is negligible; it has been replaced with the decomposition by-products of hydrazine 30, which are $N_2$ and $H_2$ (discussed in greater detail below). Use of hydrazine 30 decomposition by-products to drive turbine 4 is a novel and un-obvious advancement over prior art high altitude engines. In HDAT engine 100 outside ambient air 15 is specifically fed into compressor 6 via inlet 18 and diffuser 20. Thus, there are two different mass flows in turbine 4 and compressor 6. According to an exemplary embodiment, the mass flow in turbine 4, of decomposed hydrazine 30 ($N_2$ 26 and $H_2$ 28) is less than the mass flow of diffused air 16 in compressor 6.

Hydrazine 30 has several advantageous properties: it is a substance with positive heat of formation, and decomposes spontaneously in the presence of a catalyst to produce hot decomposition products, mainly nitrogen ($N_2$) 26 and hydrogen ($H_2$) 28, that can be expanded through a turbine to drive an ambient air compressor. Thus, by combining hydrazine with a catalyst that causes decomposition, heat can be generated.

Referring now to FIG. 1, HDAT engine 100 comprises first storage tank 32a, fuel pump 22, decomposition chamber 2, and second storage tank 32b. Hydrazine 30 is extracted from first storage tank 32a, and transferred via pump 22 to decomposition chamber 2. According to a preferred embodiment, catalyst 34 is in the form of a solid catalyst, in catalyst bed 36. According to an alternate embodiment, catalyst 34 can be stored as a liquid or gas in second storage tank 32b, and can be transferred to decomposition chamber 2 to mix with hydrazine 30. The transfer of catalyst 34 from second storage tank 32b can also be accomplished by pump 22, or a pump that is substantially similar to pump 22.

In the decomposition chamber 2, hydrazine 30 and first catalyst 34 combine and decompose hydrazine 30 into $N_2$ 26, and $H_2$ 28. Heat generated by the decomposition expands both the $N_2$ 26 and $H_2$ 28 products of the decomposition, which are then input into high pressure turbine 4. The expansion of $N_2$ 26 and $H_2$ 28 cause turbine 4 to spin, driving compressor 6. According to a preferred embodiment, the heated, expanded $N_2$ 26 and $H_2$ 28 exits turbine 4, and enters combustion chamber 8. Ambient air 15 is received via inlet 18 and diffused in diffuser 20. According to a preferred embodiment, diffused air 16 is then input into compressor 6, where compressor 6 compresses diffused air 16 into compressed air 17. Compressed air 17 is then output from compressor 6 into combustion chamber 8. According to a preferred embodiment, compressed air 17 is mixed with heated, expanded $N_2$ 26 and $H_2$ 28 in combustion chamber 8.

In combustion chamber 8, compressed air 17 and $H_2$ 28 are ignited, and the resultant energy release drives power turbine 10. According to one exemplary embodiment, the ignition or burning of air 16 and $H_2$ 28 occurs without a catalyst. According a further exemplary embodiment optional combustion catalyst 42 can be used to support or ensure a substantially complete combustion of $H_2$ 28 and compressed air 17. Power turbine 10 can, according to a preferred embodiment, drive shaft 14 that turns propeller 12. Optionally, a gearbox (not shown) can be used to allow the power turbine to spin faster than the propeller. According to an alternate embodiment, power turbine 10 can drive propeller 12 directly, with no shaft 14. Power turbine 10 can also provide power for several aircraft sub-systems, including fuel pump power 24a, electrical power 24b, and payload power 24c. Alternately, fuel pump 22, electrical power 24b and payload power 24c can be driven by turbine 4. According to still a further exemplary embodiment, high pressure turbine 4 and compressor 6 can use first shaft 14a, while power turbine 10 and propeller 12 can use a second shaft 14b. Still further, a single shaft can be used for high pressure turbine 4, compressor 6, power turbine 10, and propeller 12.

Figure 2:
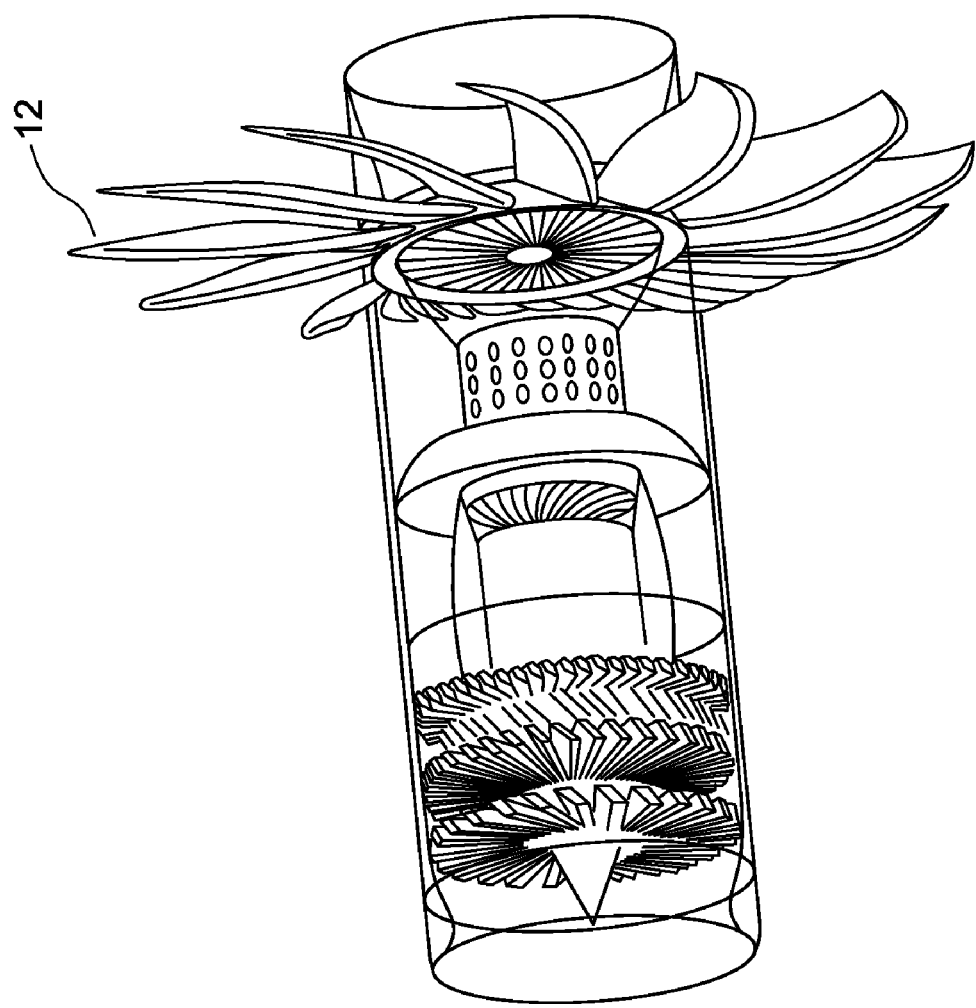
FIG. 2 illustrates a pictorial representation of a practical implementation of the very high altitude hydrazine monopropellant decomposition air turboprop engine as shown in FIG. 1.

According to an exemplary embodiment, heat generated in decomposition chamber 2 is produced by the mixing of hydrazine 30 with first catalyst 34. According to an exemplary embodiment, one example of a catalyst can be platinum, while another commercially available catalyst bed 36 is Shellzone®, which is a ceramic structure covered with either platinum or iridium. As well known to those of ordinary skill in the art, catalysts of this type cause decomposition of hydrazine 30, which gives off heat that expands the decomposition products of $N_2$ 26 and $H_2$ 28. The expanded decomposition products of $N_2$ 26 and $H_2$ 28 are then used to drive turbine 4. According to a preferred embodiment, the expanded decomposition products of $N_2$ 26 and $H_2$ 28 are transferred directly to combustion chamber 8. According to a preferred embodiment, compressed air 17 and the decomposition products $N_2$ 26 and $H_2$ 28 are then brought together in combustion chamber 8, where $H_2$ 28 is burned with compressed air 17. The products of the combustion process are then expanded to atmospheric pressure through power turbine 10 that drives propeller 12, which provides the bulk of the propulsive thrust. Some additional thrust is derived from exhaust of the complete flow stream. FIG. 2 illustrates a pictorial representation of a practical implementation HDAT engine 200 of HDAT engine 100 as shown in FIG. 1.

According to a preferred embodiment, the energy that drives HDAT engine 100, and ultimately the very high altitude aircraft it is attached to, is derived from two sources. First, the decomposition of hydrazine in chamber 2, and secondly, the substantially higher energy reaction of the hydrazine decomposition product $H_2$ 28 with compressed ambient air 17 in combustion chamber 8. The combination of decomposition energy and higher energy combustion provides several unique advantages. First, the hydrazine decomposition allows a very high reliability engine startup, regardless of the outside atmosphere. If there was a need for auxiliary power extraction, and the auxiliary loads were attached to turbine 4, turbine 4 could even be started and run in a vacuum, prior to the startup of combustion chamber 8 and power turbine 10. Second, the decomposition product of the hydrazine is hydrogen (H), which has superior properties for secondary combustion with air 17 at very low pressures. Secondary combustion of $H_2$ 28 and compressed air 17 enables HDAT engine 100 to operate with stable combustion even when the ambient air 15 is at very low pressure (less than about 0.1 psi), and the combined compression ratio of the diffuser 20 and compressor 6 is modest. According to an exemplary embodiment, as a result of high reliability startup, secondary combustion, and modest compression ratios of between about 4:1 and about 10:1, HDAT engine 100 can be made compact and light in weight. According to a preferred embodiment, the compression ratio is about 5:1.

According to further exemplary embodiments, several novel and unique features are realized as a result of the use of hydrazine 30 as a monopropellant in HDAT engine 100 as discussed herein. According to a preferred embodiment, using a chemically unstable substance (such as hydrazine 30 ($N_2H_4$)) that can be reliably decomposed via a catalyst ensures a substantially reliable starting and running process, independent of the altitude and substantially independent of the ambient pressure. Another unique feature according to a preferred embodiment is the expansion of the $N_2$ 26 and $H_2$ 28 decomposition products through high pressure turbine 4 to drive ambient air compressor 6, providing compressed air for combustion of the combustible part (i.e., $H_2$) of the decomposition products, thus making available substantially all of the chemical energy of the hydrazine 30 ($N_2H_4$).

According to still further exemplary embodiments, other novel, unique and non-obvious features are realized as a result of the use of hydrazine 30 as a monopropellant in HDAT engine 100 as discussed herein. According to a preferred embodiment, final combustion, which occurs in combustion chamber 8, is of $H_2$ 28 in air 17 and occurs with wide flammability limits even at very low pressures. According to a preferred embodiment, the stoichiometry flammability limits range from about 0.2 to about 1.8, at pressure levels at or near atmospheric. According to a preferred embodiment, the pressure in combustion chamber 8 is about 1 psia. That is, according to an exemplary embodiment, the mixture ratios of hydrazine 30 to air 17 can encompass a wide range of values. According to an exemplary embodiment, the mixture ratio of hydrazine 30 to air 17 is between about 1:3 to about 1:8. According to a preferred embodiment, the mixture ratio of hydrazine 30 to air 17 is about 1:5. According to still a further exemplary embodiment, a catalyst, for example platinum, can be used to support or ensure combustion of $H_2$ 28 and air 16 at the pressure and altitudes the very high altitude airplane is designed to operate within (at or about 110,000 feet). According to a preferred embodiment, the final combustion products of the air 17 and $H_2$ 28, which are predominantly $N_2$ and $H_2O$, expand in power turbine 10, thereby driving propeller 12 (and/or a fan) and provide the bulk of the propulsive thrust.

According to a preferred embodiment, the use of hydrazine 30 as a monopropellant provides simple and reliable operation as compared to conventional hydrocarbon fueled gas turbines, which require an extended startup process. HDAT engine 100, according to a preferred embodiment, can be started at substantially any altitude within the very high altitude operating area, by initiating flow of hydrazine 30 into the catalyst bed, and can be throttled to reduce the thrust simply by reducing the hydrazine 30 flow rate.

Figure 3:
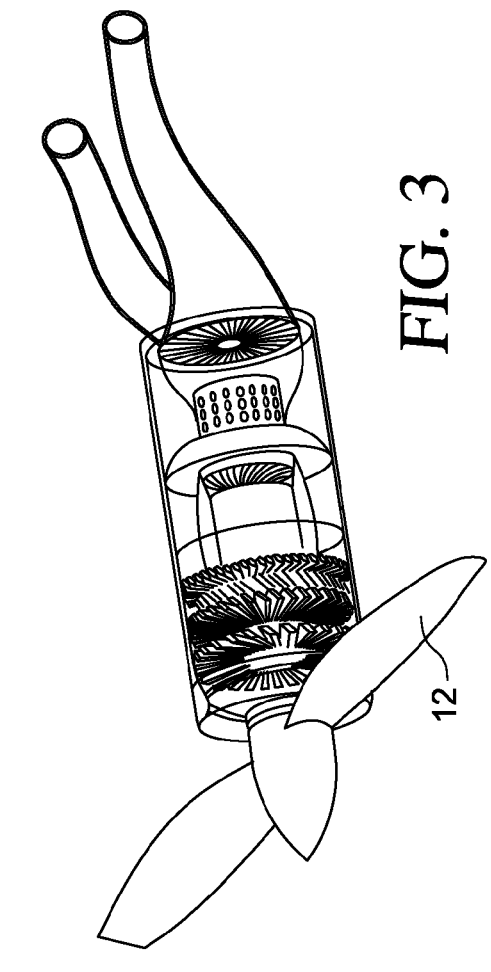
FIG. 3 illustrates an alternate embodiment of a practical implementation of the very high altitude hydrazine monopropellant decomposition air turboprop engine as shown in FIG. 1.
Figure 4:
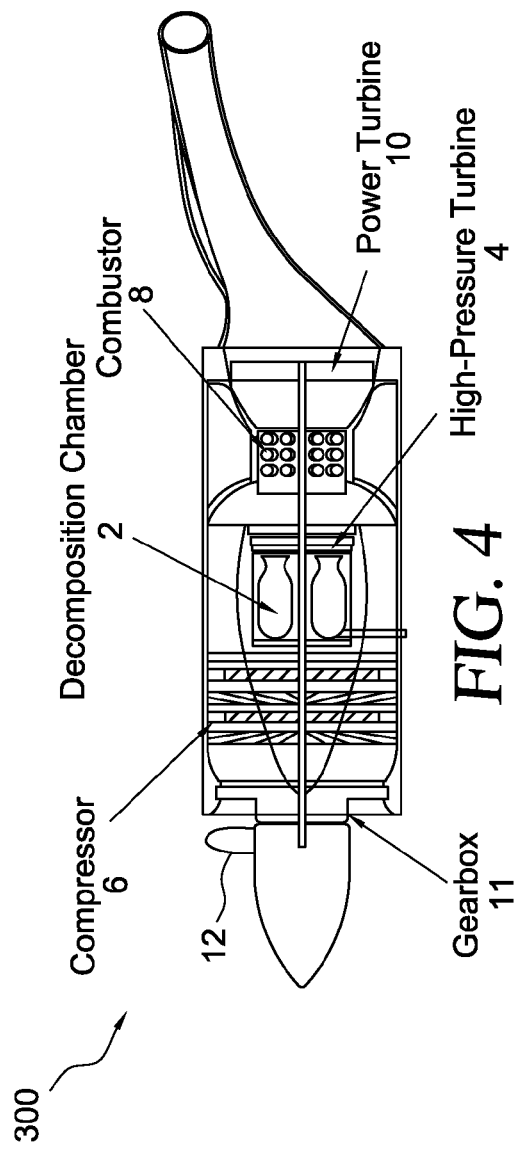
FIG. 4 illustrates a cut-away side view of the very high altitude hydrazine monopropellant decomposition air turboprop engine as shown in FIG. 3.

FIG. 3 illustrates an alternate embodiment of a practical implementation of the very high altitude hydrazine monopropellant decomposition air turboprop (HDAT) engine 300 as shown in FIG. 1. HDAT engine 300 shown in FIGS. 3 and 4 are substantially similar to HDAT engine 200 shown in FIG. 2, with the exception of propeller 12, which, in HDAT engine 200, is a multi-blade propeller, or un-ducted fan, directly driven by the turbine, and in HDAT engine 300 (FIGS. 3 and 4), is a two-blade propeller driven by a shaft and speed reduction gearbox 11. FIG. 4 illustrates a cut-away side view of HDAT engine 300. According to several alternate embodiments, propeller 12 can be located at the front of the engine, at the rear, or directly off of power turbine 10.

Figure 5:
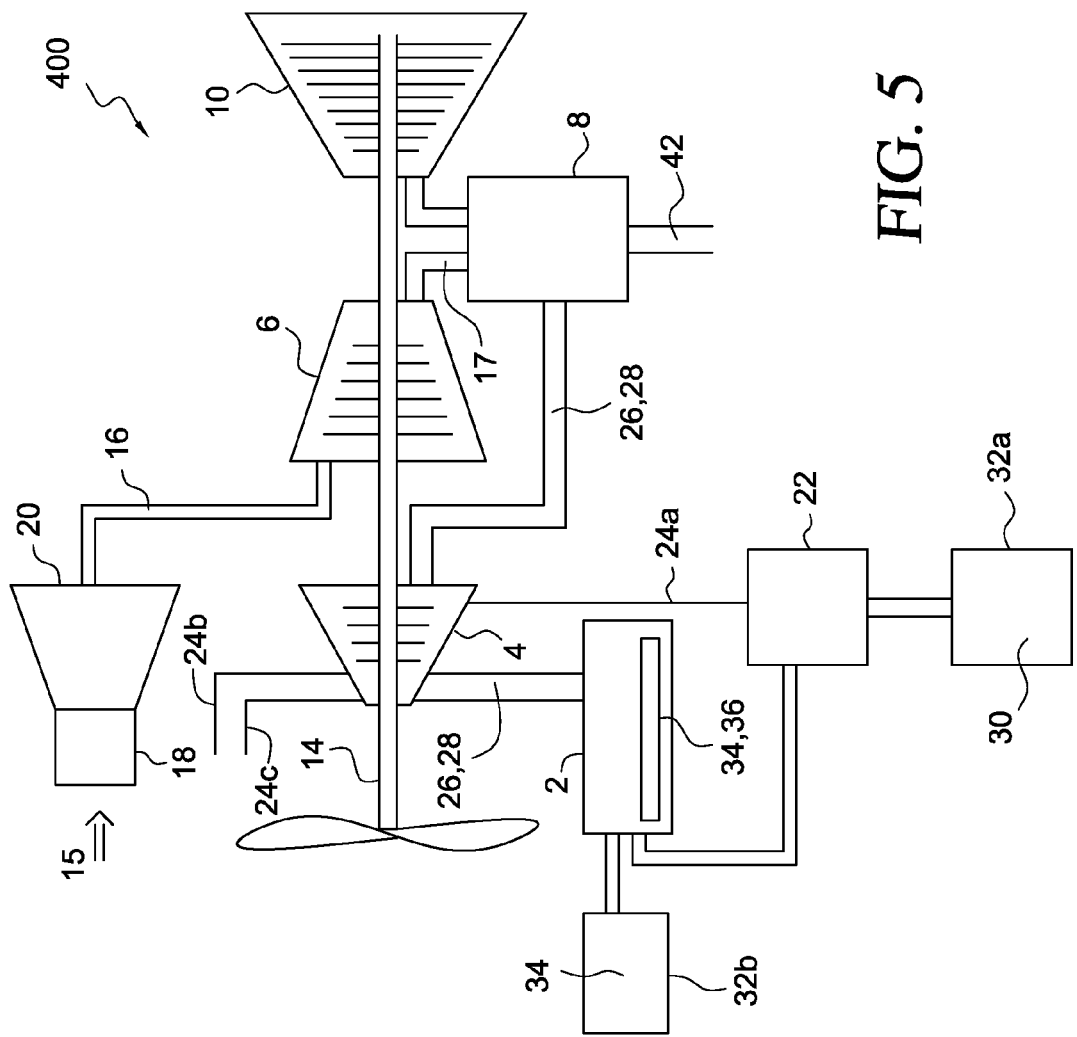
FIG. 5 illustrates a block diagram a very high altitude hydrazine monopropellant decomposition air turboprop engine according to an embodiment of the present invention.

FIG. 5 illustrates a block diagram with thermodynamic notations of a very high altitude hydrazine monopropellant decomposition air turboprop (HDAT) engine 400 according to an exemplary embodiment. The block diagram of HDAT engine 400 shown in FIG. 5 is substantially similar to the block diagram of HDAT engine 100; however, power extractions 24a-c are taken from high pressure turbine 4 in HDAT 400 as shown in FIG. 5, as opposed to being extracted from power turbine 10 as shown in HDAT 100, FIG. 1. According to a preferred embodiment, by extracting power from high pressure turbine 4 instead of power turbine 10, payload vehicle and pump power are available sooner from HDAT engine 400 than from HDAT engine 100. Payload power is also available sooner in HDAT engine 400 because high pressure turbine 4 will begin spooling up to power sooner than power turbine 10. As a result, power from a battery (not shown) to otherwise provide payload power 24a-c over the time period between operation of high power turbine 4 and operation of power turbine 10 can be eliminated. The savings in power requirements can reduce the size of the battery in the aircraft, thereby saving cost, but more importantly, saving weight. The savings in weight can be used for increased payload and/or fuel, among other items.

According to a preferred embodiment, HDAT engine 400 (as shown in FIG. 5) can generate about 93.9 KW of power (about 125.94 horse power) at 110,000 feet above sea-level while developing an engine thrust value of about 412 newtons, or 93 lbf. The specific fuel consumption (SFC) for the exemplary embodiment of HDAT 400 as shown in FIG. 5 is about 0.73 Kg/KW/hr (or 1.20 lb/HP/hr). The thrust specific fuel consumption (TSCF) value is about 1.629 N/N/hr (Newton/Newton/hr), providing about 7 hours of endurance. The values of power, engine thrust, SFC, TSFC, described above for FIG. 1 also substantially apply for FIGS. 1 and 6.

Still further according to a preferred embodiment, HDAT engine 100, 200, 300, 400 can operate at or about Mach 0.6, at an altitude of about 110,000 feet, while producing 126 shaft horsepower and a SFC (lb/HP-hr) of 1.20. According to a preferred embodiment, the compressor pressure ratio is about 5, and the Mdot value for hydrazine 30 (lb/s at beginning of flight) is 0.042.

According to an exemplary embodiment, HDAT engine 100, 200, 300, and 400 can be implemented with a range of choices of the parameters that define the design. Principally these (with typical values) include a compressor pressure ratio in the range of about 5 to about 7; an air/hydrazine flow ratio in the range of about 5 to about 7; hydrazine 30 decomposition pressure and temperature of about 850K at about 100 atm.; and a combustion chamber pressure of about 0.03 atm.

II. Monopropellant Air Turbo Ramjet

Figure 6:
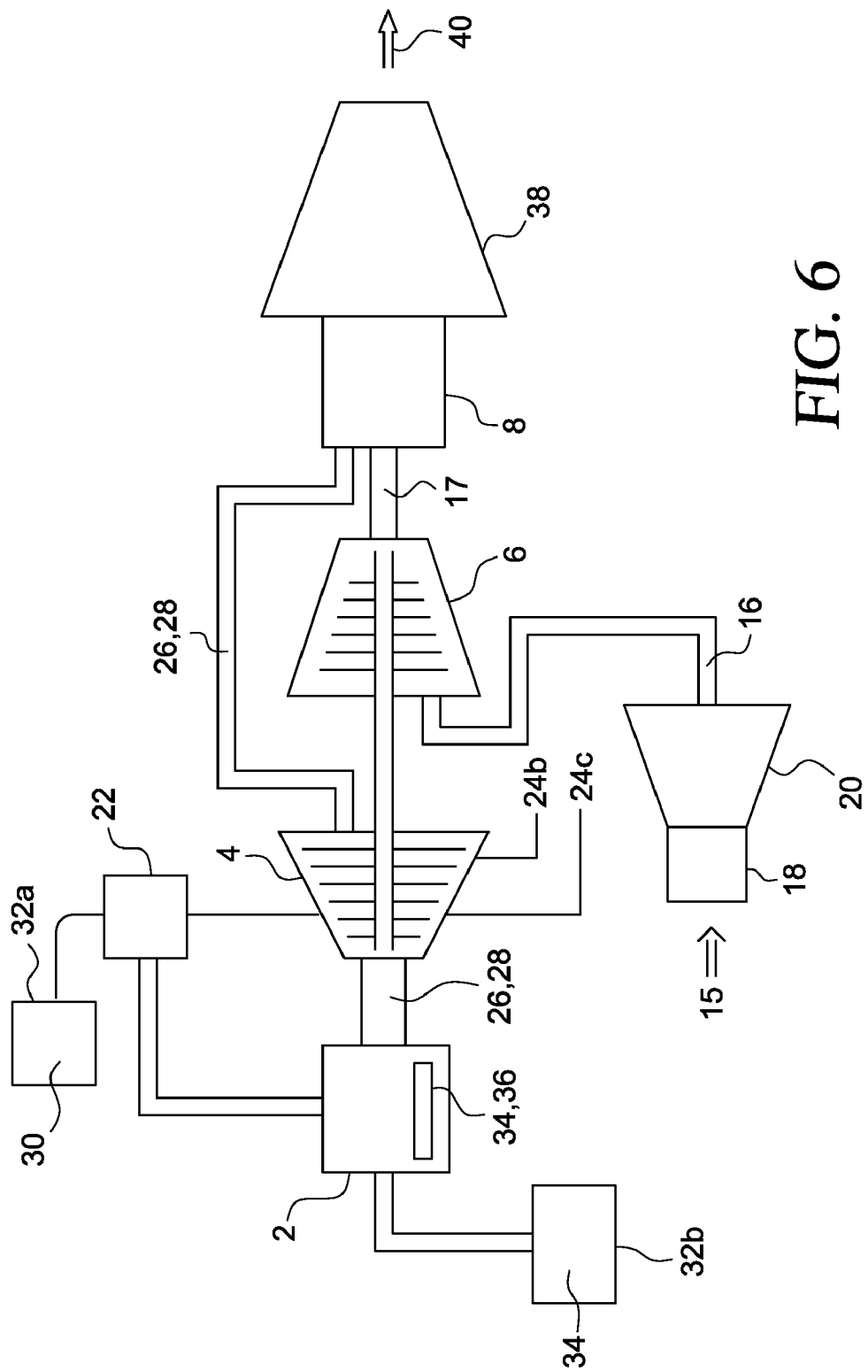
FIG. 6 illustrates a block diagram of a very high altitude hydrazine monopropellant air turbo ramjet engine according to an embodiment of the present invention.

FIG. 6 illustrates a block diagram of a very high altitude hydrazine monopropellant air turbo (HMAT) ramjet engine 500 according to an exemplary embodiment. HMAT ramjet engine 500 is substantially similar to HDAT engines 100, 200, 300, 400, with the difference that instead of power turbine 10, nozzle 38 has been added. Nozzle 38 converts the combustion byproducts from combustion chamber 8 into a high pressure exhaust stream, also referred to as propulsion exhaust 40. As substantially all the components of HMAT ramjet engine 500 are the same as HDAT engines 100, 200, 300, and 400, a detailed description thereof has been omitted for the sake of brevity and clarity.

According to a preferred embodiment, HMAT ramjet engine 500 is designed to fly at mach numbers above that which is practical for a propeller driven engine. As those of ordinary skill in the art can appreciate, a limitation of about mach 0.65 exists for practical use of a propeller driven aircraft; a jet or ducted fan is more practical for mach numbers above 0.7. According to an exemplary embodiment, thermodynamically, HMAT ramjet engine 500 is substantially similar to HDAT engines 100, 200, 300, and 400, except that instead of extracting power from the combustion products through power turbine 10, the exhaust flow is ejected out of nozzle 38 as in a jet engine. According to an exemplary embodiment, the SFC calculated for about Mach 0.7 is about 1.34 kg/kW-hr. According to a preferred embodiment, HMAT ramjet engine 500 weighs about 161 kg when operating at an altitude of about 110,000 feet above sea level. According to an exemplary embodiment, HMAT ramjet engine 500 weighs less than any of engines 100, 200, 300, 400.

The present invention has been described with reference to certain exemplary embodiments thereof. However, it will be readily apparent to those skilled in the art that it is possible to embody the invention in specific forms other than those of the exemplary embodiments described above. This can be done without departing from the spirit and scope of the invention. The exemplary embodiments are merely illustrative and should not be considered restrictive in any way. The scope of the invention is defined by the appended claims and their equivalents, rather than by the preceding description.

All United States patents and applications, foreign patents, and publications discussed above are hereby incorporated herein by reference in their entireties.

What is claimed is:

1. An engine for use in operating an aircraft, the engine comprising:
   a decomposition chamber configured to decompose into at least one combustible constituent element a first chemically unstable substance in the presence of a catalyst, wherein the decomposition of the first chemically unstable substance releases a first amount of heat and the first combustible constituent element expands as a result of the first amount of heat;
   a first turbine fluidly connected to the decomposition chamber, wherein the first turbine is configured to receive only the expanded at least one constituent combustible element and the first amount of heat from the decomposition chamber, wherein the first turbine is further configured to rotate after receiving the expanded at least one constituent combustible element;
   a compressor rotationally connected to the first turbine, and configured to rotate as a result of the rotation of the first turbine, and wherein the compressor is further configured to receive air, and is further configured to compress the air as a result of the rotation of the compressor; and
   a combustion chamber fluidly connected to an outlet of the first turbine and to the compressor, and wherein the combustion chamber is configured to receive and combine (i) the compressed air and (ii) the at least one combustible constituent element, and wherein the combustion chamber is further configured to combust the combined compressed air and at least one combustible constituent element, thereby generating a combustion product.

2. The engine according to claim 1, wherein the first chemically unstable substance comprises hydrazine.

3. The engine according to claim 1, wherein the at least one combustible constituent element comprises hydrogen.

4. The engine according to claim 1, further comprising:
   a propeller;
   a power turbine fluidly connected to the combustion chamber, wherein the power turbine is configured to receive the combustion product from the combustion chamber, and wherein the power turbine is configured to rotate as a result of the received combustion product; and
   a shaft rotationally connected to the propeller, power turbine, and the first turbine, and wherein the shaft and propeller are configured to rotate when the power turbine and the first turbine rotates.

5. The engine according to claim 4, wherein
   the power turbine is rotationally coupled to the first turbine and the compressor, and the power turbine is configured to rotate as a result of the rotation of the first turbine.

6. The engine according to claim 4, wherein
   the power turbine further is configured to produce aircraft propulsion power after receiving the combustion product, and further wherein
   the power turbine is further configured to increase and decrease production of aircraft power is proportional to a first amount of the first combustible constituent element.

7. The engine according to claim 4, further comprising:
   a gearbox, wherein the gearbox is interposed between the propeller shaft and the propeller, and wherein,
      the gearbox is configured to vary the rotational speed of the propeller in relation to the rotational speed of the propeller shaft.

8. The engine according to claim 1, further comprising:
a nozzle fluidly connected to the combustion chamber, wherein the nozzle is configured to receive the combustion product and convert the combustion product into a substantially high pressure exhaust stream.

9. The engine according to claim 1, wherein the aircraft is operated at an altitude of at least 85,000 feet above sea level.

10. The engine according to claim 1, wherein a first mass flow in the first turbine is different from a second mass flow in the compressor.

11. The engine according to claim 1, wherein a first mass flow in the first turbine is less than a second mass flow in the compressor.

12. The engine according to claim 1, wherein a mixture ratio of hydrogen to air in the combustion chamber is between about 1:3 and about 1:8.

13. The engine according to claim 1, wherein a mixture ratio of hydrogen to air in the combustion chamber is about 1:5.

14. The engine according to claim 1, further comprising:
a diffuser fluidly connected to the compressor, wherein the diffuser is configured to receive ambient air and diffuse the ambient air, and wherein
the diffuser is further configured to output the diffused air to the compressor.

15. An engine for use in operating an aircraft, comprising:
a decomposition chamber configured to decompose a chemically unstable substance in the presence of a catalyst, into a fuel, wherein the decomposition of the chemically unstable substance releases an amount of heat;
a turbine fluidly connected to the decomposition chamber, wherein the turbine is configured to receive only the decomposed chemically unstable substance and the amount of heat from the decomposition chamber, and to rotate as a result of the amount of heat;
a compressor rotationally connected to the turbine, and wherein the compressor is configured to compress air; and
a combustion chamber fluidly connected to the compressor to receive the compressed air, and fluidly connected to the decomposition chamber to receive the fuel, and wherein the combustion chamber is configured to mix the received compressed air and fuel, and is further configured to combust the fuel and compressed air mixture to produce power.

16. An engine for use in operating an aircraft, comprising:
a decomposition chamber configured to decompose into at least one combustible constituent element a chemically unstable substance in the presence of a catalyst, wherein the decomposition of the chemically unstable substance releases an amount of heat;
a turbine fluidly connected to an outlet of the decomposition chamber and configured to receive only the decomposed chemically unstable substance; and
a combustion chamber fluidly connected to an outlet of the turbine, and wherein the combustion chamber is configured to burn the at least one combustible constituent element and to produce power, and wherein an amount of the produced power is substantially directly related to the amount of heat released.

17. An engine for use in operating an aircraft, comprising:
a decomposition chamber configured to decompose into at least one combustible constituent element a chemically unstable substance in the presence of a catalyst, wherein the decomposition of the chemically unstable substance releases an amount of heat;
a turbine fluidly connected to the decomposition chamber to receive only the expanded the at least one combustible constituent element and the amount of heat from the decomposition chamber;
a compressor configured to compress ambient air; and
a combustion chamber fluidly connected to an outlet of the turbine and to the compressor, and wherein the combustion chamber is configured to receive and mix the compressed ambient air and the at least one combustible constituent element, and wherein the combustion chamber is configured to burn the mixture of the at least one combustible constituent element and the compressed air when the ambient air pressure is less than about 0.3 psi to produce power.

18. An engine for use in operating an aircraft, comprising:
a decomposition chamber configured to decompose into at least one combustible constituent element an element of a chemically unstable substance in the presence of a catalyst, wherein the decomposition of the chemically unstable substance releases an amount of heat;
a first turbine fluidly connected to the decomposition chamber, and wherein the first turbine is configured to receive only the at least one constituent element and the amount of heat from the decomposition chamber, and wherein upon receipt of the first amount of heat the first turbine is configured to rotate;
a compressor rotationally connected to the first turbine, wherein the compressor is configured to receive ambient air, and the compressor is further configured to compress the ambient air;
a combustion chamber fluidly connected to an outlet of the first turbine and to the compressor, and wherein the combustion chamber is configured to receive and combine the compressed air and the at least one constituent element from the first turbine and to combust the combination; and
a second turbine fluidly connected to the combustion chamber, and wherein the second turbine is configured to rotate and produce power as a result of the combustion of the air and the at least one constituent element, and further wherein the second turbine is configured to increase or decrease production of power in proportion to an amount of the chemically unstable substance in the decomposition chamber.

19. An aircraft operating at or above 85,000 feet above sea level, comprising:
a fuselage;
one or more lift generating surfaces attached or part of the fuselage;
one or more control surfaces, wherein the control surfaces are configured to control the aircraft in roll, spin and yaw directions; and
an engine, wherein the engine includes:
a decomposition chamber configured to decompose into at least one combustible constituent element a chemically unstable substance in the presence of a catalyst, wherein the decomposition of the chemically unstable substance releases an amount of heat, and wherein the at least one combustible constituent element expands as a result of the amount of heat;
a turbine fluidly connected to the decomposition chamber, wherein the turbine is configured to receive only the expanded at least one constituent combustible element from the decomposition chamber, wherein the turbine is further configured to rotate after receiving the expanded at least one constituent combustible element;

a compressor rotationally connected to the turbine, and configured to rotate as a result of the rotation of the turbine, and wherein the compressor is further configured to receive air, and is further configured to compress the air as a result of the rotation of the compressor; and a combustion chamber fluidly connected to the first turbine and the compressor, and wherein the combustion chamber is configured to receive and combine the compressed air and the at least one combustible constituent element, and wherein the combustion chamber is further configured to combust the combination, thereby generating a combustion product.

20. The aircraft according to claim 19, wherein the chemically unstable substance comprises hydrazine.

21. The aircraft according to claim 19, wherein the at least one combustible constituent element comprises hydrogen.

22. The aircraft according to claim 19, further comprising:
a propeller;
a power turbine fluidly connected to the combustion chamber, wherein the power turbine is configured to receive the combustion product from the combustion chamber, and wherein the power turbine is configured to rotate as a result of the received combustion product;
a shaft rotationally connected to the propeller, the power turbine, and the turbine, and wherein the shaft and propeller are configured to rotate when the power turbine and the turbine rotate;
a gearbox, wherein the gearbox is interposed between the propeller shaft and the propeller, and wherein the gearbox is configured to vary the rotational speed of the propeller in relation to the rotational speed of the propeller shaft; and
a diffuser fluidly connected to the compressor, wherein the diffuser is configured to receive ambient air and diffuse the ambient air, and wherein the diffuser is further configured to output the diffused air to the compressor.

23. The aircraft according to claim 19, wherein the engine further comprises:
a nozzle fluidly connected to the combustion chamber, wherein the nozzle is configured to receive the combustion product and convert the combustion product into a substantially high pressure exhaust stream.

24. The aircraft according to claim 19, wherein the aircraft is operated at an altitude of at least 85,000 feet above sea level.

25. The aircraft according to claim 19, wherein a first mass flow in the turbine is different from a second mass flow in the compressor.

26. The aircraft according to claim 19, wherein a first mass flow in the turbine is less than a second mass flow in the compressor.

27. The aircraft according to claim 19, wherein a mixture ratio of hydrogen to air in the combustion chamber is between about 1:3 and about 1:8.

28. The aircraft according to claim 19, wherein a mixture ratio of hydrogen to air in the combustion chamber is about 1:5.

\* \* \* \* \*